United States Patent [19]

Else et al.

[11] 4,348,711
[45] Sep. 7, 1982

[54] METHOD AND APPARATUS FOR IMPLANTING A CHARGE IN AN ELECTRET FOIL

[75] Inventors: Ronald Else, Martlesham; Michael A. O'Sullivan, Ipswich, both of England

[73] Assignee: The Post Office, London, England

[21] Appl. No.: 162,904

[22] Filed: Jun. 25, 1980

[30] Foreign Application Priority Data

Jul. 6, 1979 [GB] United Kingdom ................ 7923737

[51] Int. Cl.³ ............................................. H01G 7/02
[52] U.S. Cl. .................................... 361/233; 307/400
[58] Field of Search ............... 361/225, 221, 233, 235, 361/229; 307/400; 427/26, 32, 35, 39; 353/3 CH, 3 TE

[56] References Cited

U.S. PATENT DOCUMENTS

| | | | |
|---|---|---|---|
| 3,626,260 | 12/1971 | Kimura | 361/225 |
| 3,678,350 | 7/1972 | Matsumoto et al. | 361/229 |
| 3,684,364 | 9/1972 | Schmidlin | 361/235 X |
| 3,757,165 | 9/1973 | Adachi et al. | 361/221 X |
| 3,873,895 | 3/1975 | Gallo, Jr. et al. | 361/225 |
| 4,089,034 | 5/1978 | Taylor et al. | 361/233 |

FOREIGN PATENT DOCUMENTS 1212499 11/1970 United Kingdom ................ 361/225

OTHER PUBLICATIONS

"Electret Transducers Applied to the Telephone'-'—Roedyk, IEEE Transactions on Audio & Electroacoustics, vol.-AU-19, No. 1, 3/71.

Primary Examiner—Harry E. Moose, Jr.
Attorney, Agent, or Firm—Mason, Fenwick & Lawrence

[57] ABSTRACT

In previously proposed arrangements for charging an electret foil the electret charge implanted varies over the area of the foil. In order to promote more even charging of the foil, the method of the invention subjects the foil to a progressively increasing electric field. One form of apparatus used to carry out the method has rollers at progressively higher potentials and electric fields are applied across the foil between these rollers and a metallized layer on the rear face of the foil which is earthed by a roller.

20 Claims, 7 Drawing Figures

METHOD AND APPARATUS FOR IMPLANTING A CHARGE IN AN ELECTRET FOIL

This invention relates to a method and apparatus for implanting a charge in an electret foil.

It has been proposed to charge a strip of electret foil by passing one face of the strip over an electrode connected to a source of high voltage while making electrical contact with the other face of the strip so that an electric field is applied across the foil. Normally the electric field is applied while the electret foil is at an elevated temperature but in our copending British patent application No. 34018/78 published on Feb. 28, 1979 under No. 2002961, there is described a proposal for charging a strip of electret foil at room temperature in which the electrode over which the strip is passed is a knife edge.

We have found that there are some disadvantages with these proposed charging methods. First we have found that the magnitude of the electret charge implanted into the material will vary from one batch of material to another, even though the charging conditions are apparently identical. Secondly, we have found that within a single strip of film there is a variation over the width and length of the strip of the magnitude of implanted electret charge. When the electret foil is employed, for example in the production of microphone transducers, the variation in electret charge of the foil results in variation in the sensitivity of the transducers and either this variation has to be tolerated or the transducers have to be individually tested adding significantly to their manufacturing cost.

It is an object of the invention to provide an improved method and apparatus for implanting a charge in an electret foil.

According to the invention a method of implanting a charge in an electret foil includes applying a first electric field and thereafter a second electric field across the foil, the second electric field being of greater magnitude than the first.

We have found that the uneven electret charging mentioned above arises because during the manufacturing process the foil has an adventitious electret charge implanted into it due to the high electrostatic voltages produced during mechanical handling and rolling of the foil. Any area of the foil that has this adventitious electret charge in it before charging will in the first charging process accept a different amount of charge from the knife edge than a non-charged area of foil, since the effective electric field applied to the adventitiously charged area differs from that applied to the non-charged area. By charging the foil progressively all of the foil is first charged to not less than about the highest electret charge implanted during manufacture and is then further charged to the required final level. Since for the further charging, the foil starts with a relatively even electret charge the final charge implanted into the foil is very much more even than if the foil is subjected to only one electric field.

Preferably at least three electric fields are applied successively across the foil, the magnitude of the electric fields increasing progressively. In one embodiment of the invention five electric fields are applied successively across the foil. With five electric fields the implantation of charge is substantially even over the whole width and length of the electret foil.

Instead of applying a succession of discrete and progressively greater electric fields of the electret foil, the magnitude of the electric field may be increased continuously from a first value up to the maximum electric field to be applied.

The method may be carried out as a continuous process. In this case the charging of the foil in a succession of discrete stages may be achieved by passing the electret foil over a series of electrodes maintained at progressively higher positive or negative potentials. The charging of the foil by a continuously increasing electric field may be achieved by passing the electret foil over the surface of a resistive element having one end maintained at a higher positive or negative potential than the other end, there being a continuous change in potential along the element from one end to the other.

As an alternative, the method may be carried out by passing the foil over an electrode at a first positive or negative potential and then passing the foil over the same electrode at a second positive or negative potential higher than the first potential.

The greatest electric field applied across the electret foil may lie in the range of from about 30 to about 100 MV/m. In the case of a foil of 12.5 $\mu$m thickness this field is achieved by applying from about 375 to about 1250 volts across the foil.

The electrodes by which the electric fields are applied may be electrically conducting rollers.

The foil may be provided with a metallised surface on one face and this face may be passed over an electrically conducting roller by which the electric field is applied. The electrically conducting roller may be at earth potential.

The electret foil may be polytetrafluoroethylene, for example that sold under the trademark FEP Teflon. Alternative materials which may for example be used are polycarbonates or Mylar (RTM).

According to another aspect of the invention there is provided an electret foil having a charge which has been implanted by a method as defined above.

According to another aspect of the invention there is provided an electroacoustic transducer including an electret foil as defined above. The transducer may be incorporated in a telephone.

According to another aspect of the invention there is provided an apparatus for implanting a charge in an electret foil, the apparatus including:

means defining a path for a strip of foil, a plurality of electrodes disposed along one side of the path of the foil for making electrical contact with one face of the strip of foil, electrical contact means on the other side of the path for making electrical contact with the other face of the strip of foil, and means for applying a voltage between the electrodes and the electrical contact means, the arrangement being such that the voltage applied to the electrodes is of greater magnitude towards the downstream end of the path.

The plurality of electrodes preferably comprises at least three electrodes, the voltage applied to the electrodes increasing progressively towards the downstream end of the path. The electrodes may each be connected to a respective point in a potential divider network.

A first spool may be provided at the beginning of the path for storing a strip of foil to be treated. A second spool may be provided at the end of the path for receiving the strip of foil after treatment. The second spool may be connected to drive means to draw foil along the path. The first spool may be provided with a brake for tensioning foil along the path.

An electrostatic measuring probe may be located adjacent the path downstream of the electrodes to measure the effectiveness of the treatment of foil.

By way of example an embodiment of the invention will now be described with reference to the accompanying drawings in which.

Figure 1:
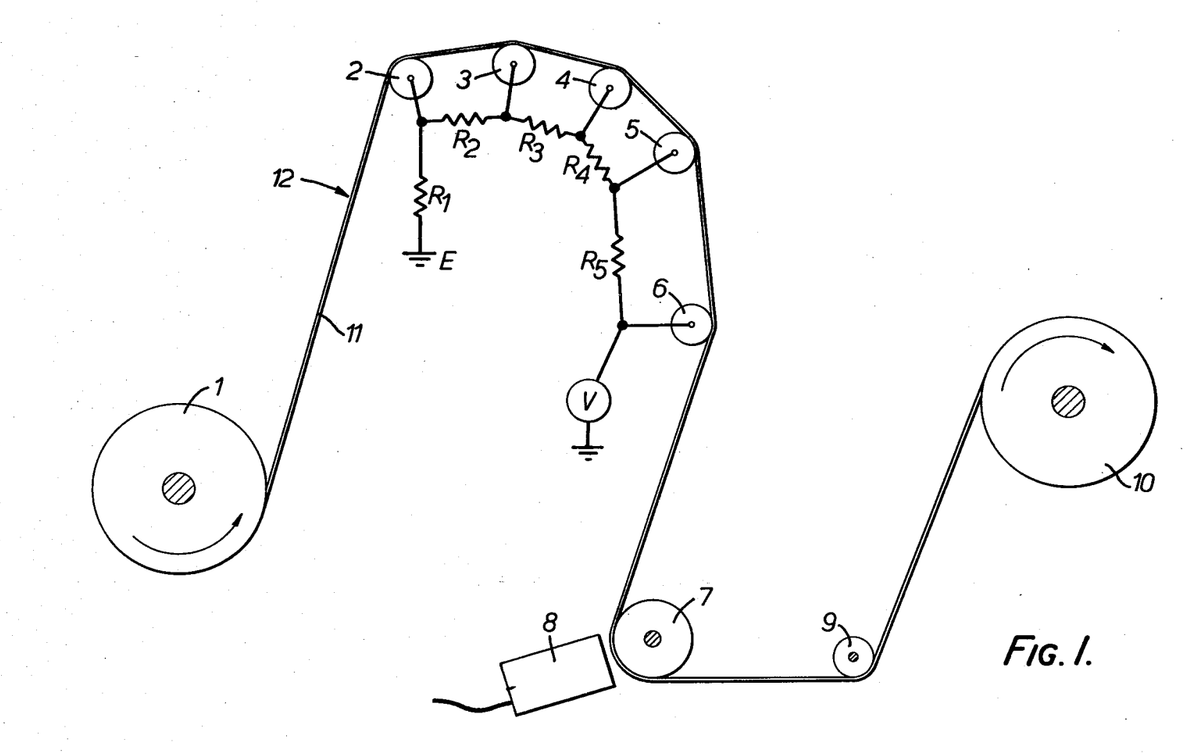
FIG. 1 is a schematic side view of an apparatus for implanting a charge in an electret foil.

The apparatus shown in FIG. 1 includes an electret foil supply spool 1, electrically conducting rollers 2, 3, 4, 5 and 6, an electrically conducting roller 7 electrically connected to earth, an electrostatic measuring probe 8 a guide roller 9, and a take-up spool 10. The apparatus is housed in a chamber (not shown) having a filtered air unit to maintain the chamber full of clean air.

A strip of FEP Teflon (Trade Mark) foil 11 is wound on the supply spool 1 and is provided with an aluminised surface 12 on one face which is located on the inner side of the foil when the foil is on the supply spool. The foil 11 passes from the supply spool 1 over the rollers 2, 3, 4, 5 and 6, around the earthed roller 7 under the guide roller 9 and onto the take-up spool 10.

The rollers 2, 3, 4, 5 and 6 are each connected to a respective point of a potential divider network consisting of resistors R1, R2, R3, R4 and R5 connected in series between earth E and a voltage source V. The full voltage from the source V is applied to the roller 6 and proportions of the full voltage are applied to the rollers 2, 3, 4 and 5. In the particular example of the invention being described the resistor R1 is 40 MΩ and the resistors R2, R3, R4 and R5 are each 10 MΩ so the voltages applied to the rollers 2, 3, 4 and 5 are $\frac{1}{2}$, $\frac{5}{8}$, $\frac{3}{4}$ and $\frac{7}{8}$ of the full voltage respectively.

The treatment of the foil is carried out at ambient temperature as a continuous process. The foil is drawn by the take-up spool 10 from the supply spool 1, under tension controlled by a brake (not shown), which may be an electro-motive brake, on the supply spool. The take-up spool 10 is driven by a motor (not shown), the speed of which may be adjusted by an operator. The foil passes around the rollers 2, 3, 4, 5 and 6 which are arranged in an arc and then passes around the earthed roller 7 which makes electrical contact with the aluminised surface 12 of the foil and thus ensures that the aluminised surface 12 is maintained at earth potential, not only in the vicinity of the roller 7 but along the entire length of the film. After passing around the roller 7, the film passes under the guide roller 9 and is wound onto the take-up spool 16.

The charging of the foil 11 is monitored by the electrostatic measuring probe 8 which scans the surface potential of the complete width of the film. The degree of uniformity of potential is indicative of the evenness of charging. As the foil 11 is wound onto the take-up spool 10 the electrostatic charge on the non-aluminised surface of the foil 10 leaks to earth by virtue of the contact of that surface with the aluminised surface of an adjacent layer of foil wound on the spool.

Figure 2A:
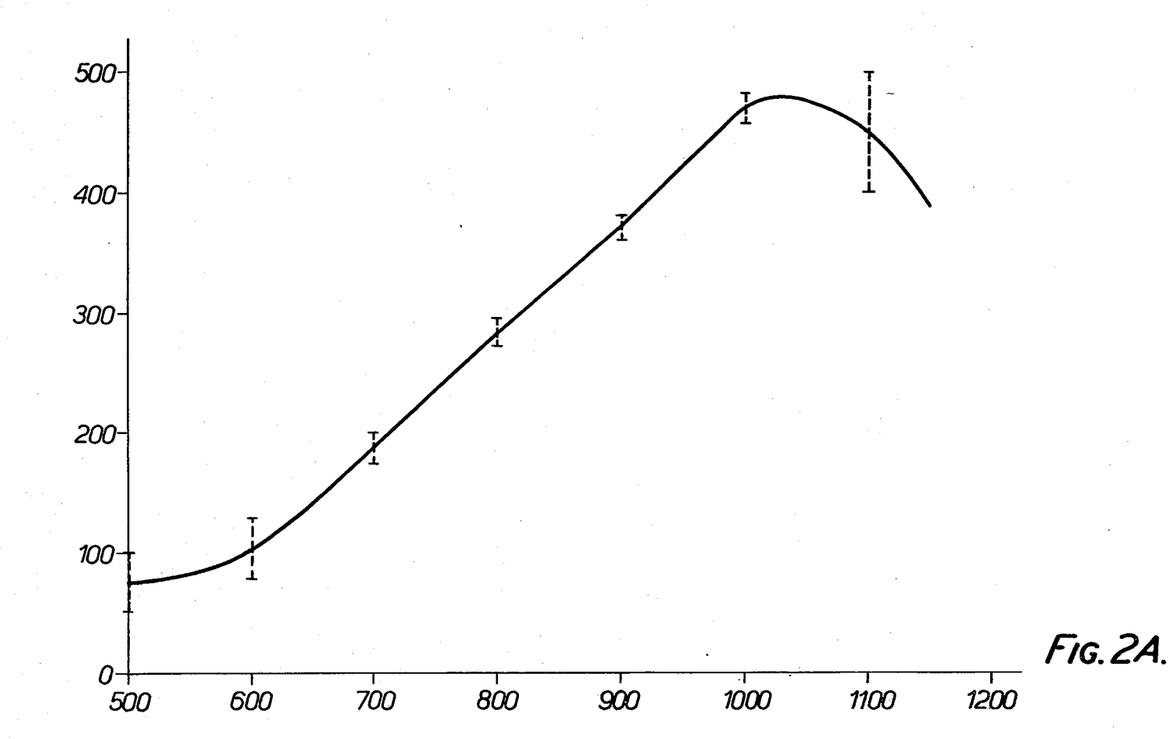
FIGS. 2A and 2B are graphs showing the variation of the electret charge implanted according to the voltage applied to the foil for the method embodying the invention and a previously proposed method.
Figure 2B:
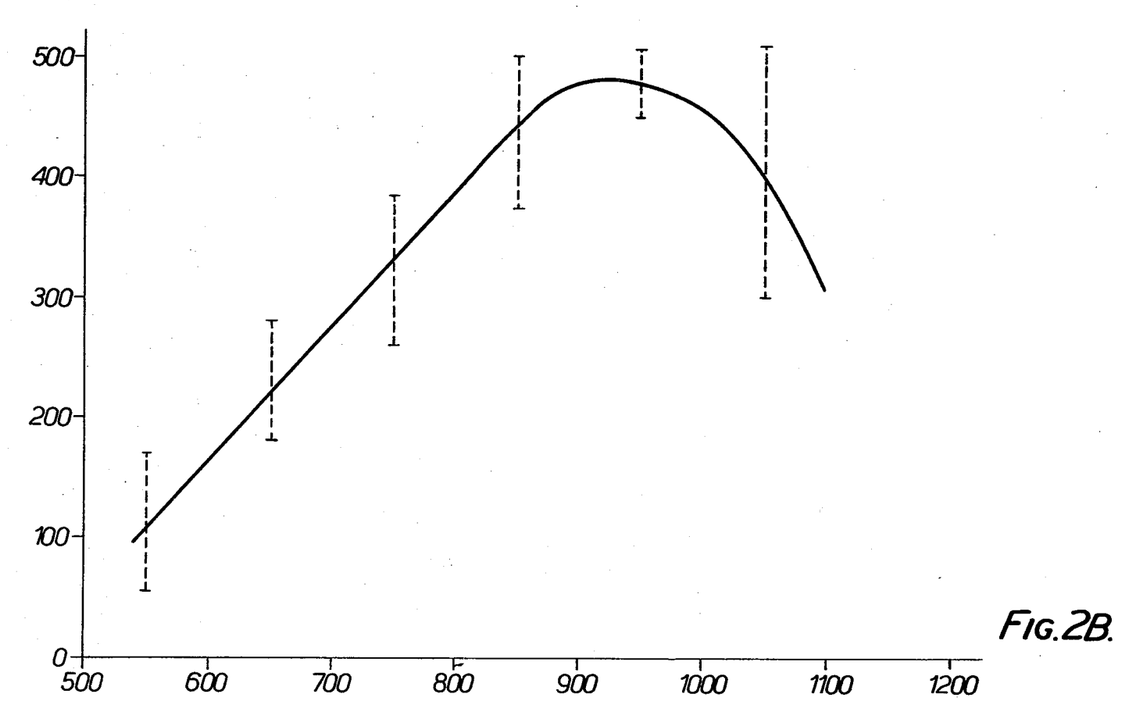

Tests have been conducted on a film of 12.5 μm thickness using the apparatus shown in FIG. 1 and varying the voltage of the voltage source V. FIG. 2A shows the results of these tests, the vertical axis of the graph being the electret voltage (measured in volts) implanted into the foil and the horizontal axis being the voltage of the voltage source V. FIG. 2B shows the results of tests on the same material but using a single knife edge to charge the foil.

Figure 3A:
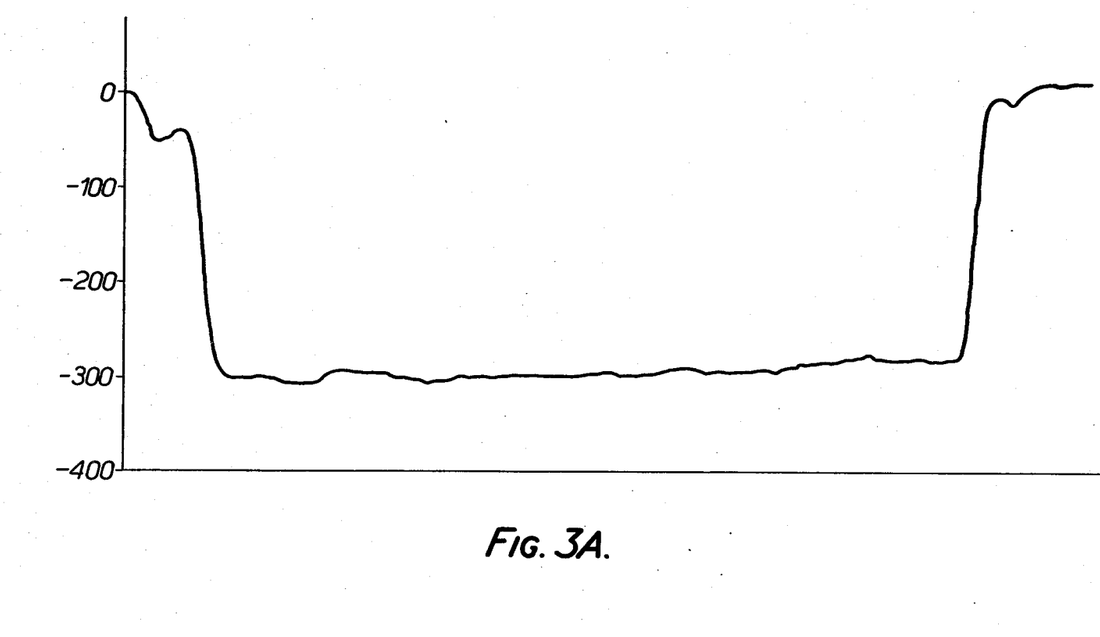
FIGS. 3A and 3B are graphs showing the variation across a strip of foil of the electret charge implanted for the method embodying the invention and a previously proposed method.
Figure 3B:
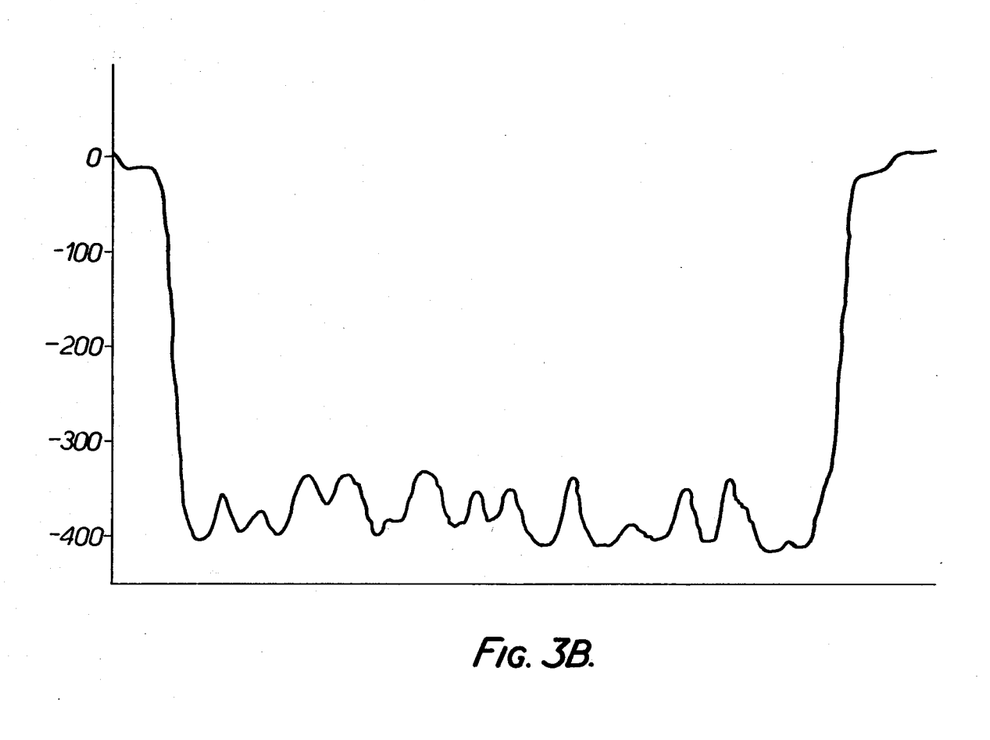

For both sets of tests the electret voltage and variation in the electret voltage implanted into the foil was measured. The vertical dashed lines in FIGS. 2A and 2B show the total range of electret voltages implanted by a given treatment. It can easily be seen from comparison of FIGS. 2A and 2B show that a more even distribution of charge is obtained by employing progressive charging than by employing a single knife edge. This point is further demonstrated by FIGS. 3A and 3B in each of which the vertical axis is the electret voltage (measured in volts) implanted into the foil and the horizontal axis is the distance across the width of the electret film at which the electret voltage is measured. The results of FIG. 3A were obtained using the apparatus of FIG. 1 and applying a voltage of −800 volts from the voltage source V across a foil of 75 mm width and 12.5 μm thickness. The results of FIG. 3B were obtained on the same foil but using a single knife edge as the charging electrode, the knife edge being maintained at a voltage of −800 Volts. Again it will be seen that a more even distribution of charge is obtained by employing progressive charging than by employing a single electrode.

The method and apparatus described above enable a more even charge charge distribution to be obtained in the electret foil, and the electret voltage implanted is substantially independent of any adventitious electret charge implanted during manufacture of the foil and of variations in the thickness of the foil.

The use of rollers as the electrodes enables good electrical contact to be made with the foil and also minimises the friction on the foil as it passes through the apparatus.

The method and apparatus described above relate to an electret foil of 12.5 μm thickness and 75 mm width. However the method and apparatus are equally suitable for charging foils of other widths and thicknesses which may be chosen according to the purpose for which the foil is required.

The provision of a metallised surface on one face of the electret foil facilitates the making of a good electrical contact with this face of the foil but it is not essential. If the metallised surface is omitted contact can be made by electrically conducting earthed rollers positioned opposite each of the rollers connected to the voltage source.

Figure 4:
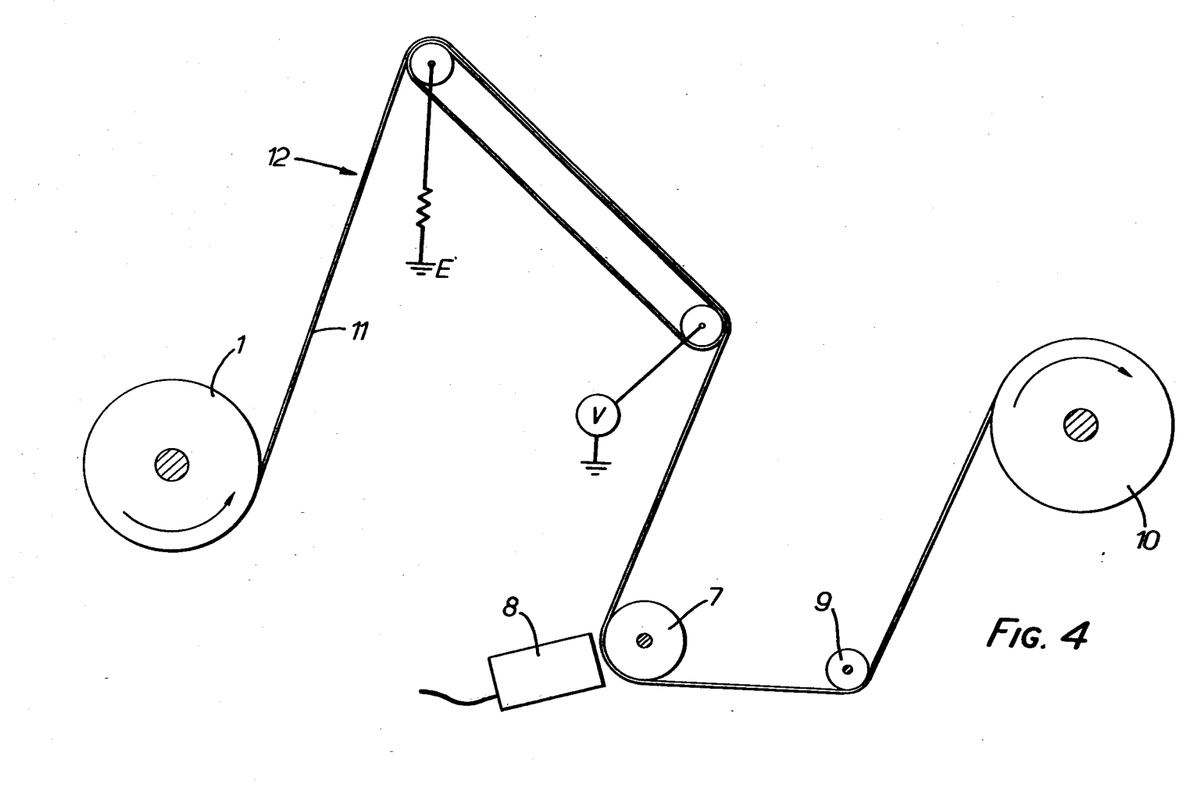
FIG. 4 is a schematic side view of a modified form of the apparatus shown in FIG. 1.

Instead of providing a series of rollers along the electret foil path maintained at progressively higher potentials a continuous increase in potential may be provided along the path. This may be achieved as shown in FIG. 4 by providing a belt of resistive material passing around two electrically conducting rollers and running along the path of the foil between the rollers, a voltage source being connected to the downstream roller and the upstream roller being connected through a resistor to earth.

Figure 5:
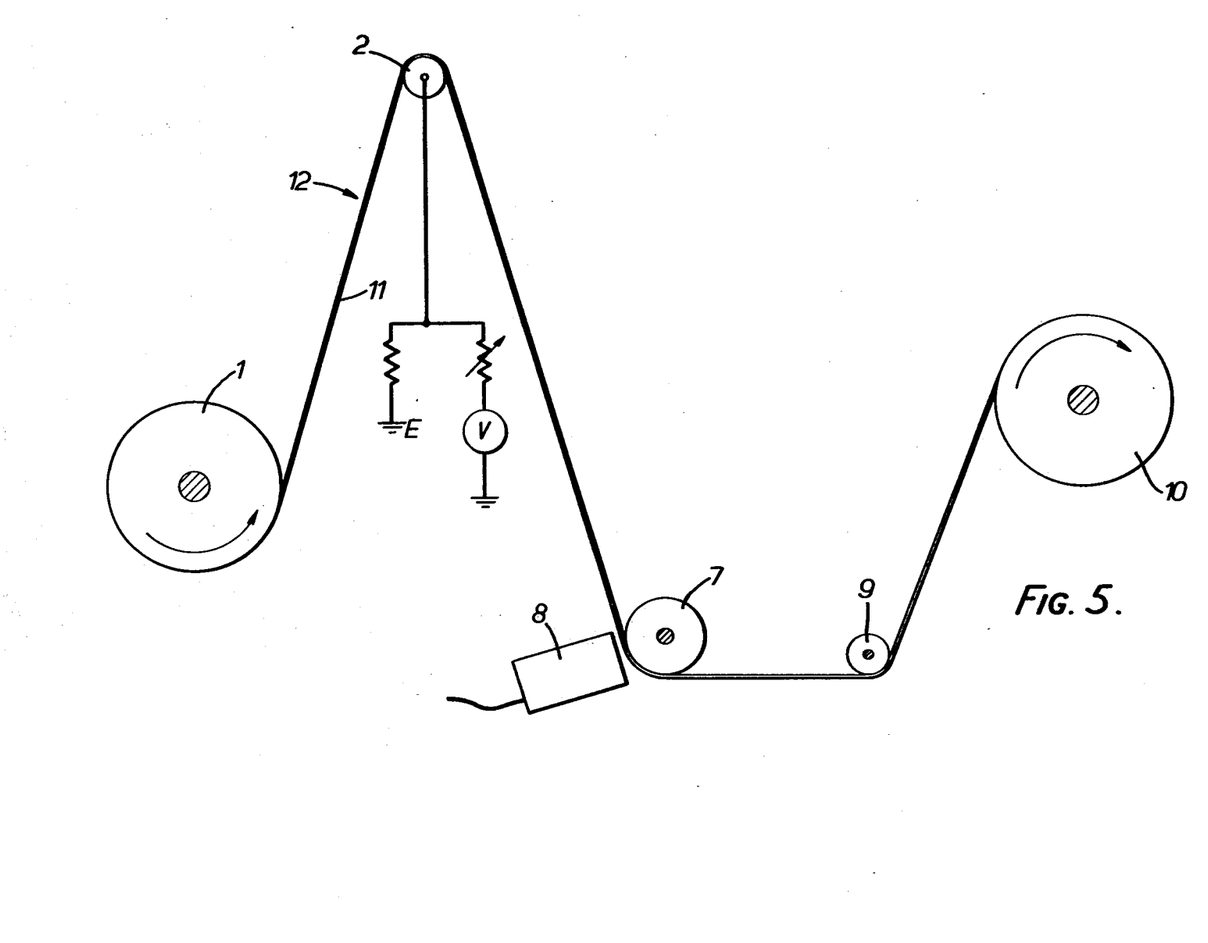
FIG. 5 is a schematic side view of another modified form of the apparatus shown in FIG. 1.

It is possible to carry out the method of the invention using a single electrode as shown in FIG. 5. In this case the electret foil may be passed over the electrode while it is maintained at a first potential and then passed one or more further times over the electrode with the electrode maintained at a higher potential than on the previous pass.

The charging of the foil described with reference to the drawings is carried out at room temperature, but it will be understood that the treatment could also be carried out at a higher temperature.

What is claimed is:

1. A method of implanting an electret charge into a foil capable of retaining an effective electret charge, the method including applying a first electric field and thereafter a second electric field across the foil, the second electric field being of greater magnitude than the first, whereby an effective electret charge is implanted into the foil.

2. A method as claimed in claim 1 in which at least three electric fields are applied successively across the foil, the magnitude of the electric fields increasing progressively.

3. A method as claimed in claim 2 in which five electric fields are applied successively across the foil.

4. A method as claimed in claim 1 in which the magnitude of the electric field applied across the foil is increased continuously from a first value up to the maximum electric field to be applied.

5. A method as claimed in claim 1 wherein the method is carried out as a continuous process.

6. A method as claimed in claim 1 in which the greatest electric field applied across the electret foil lies in the range of from about 30 to about 100 MV/m.

7. A method as claimed in claim 1 in which the foil is provided with a metallised surface on one face and this face is passed over an electrically conducting roller by which the electric field is applied.

8. A method as claimed in claim 7 in which the electrically conducting roller is at earth potential.

9. An apparatus for implanting an effective electret charge into a foil capable of retaining an effective electret charge, the apparatus including:
   means defining a path for a strip of foil,
   a plurality of electrodes disposed along one side of the path of the foil for making electrical contact with one face of the strip of foil,
   electrical contact means on the other side of the path for making electrical contact with the other face of the strip of foil, and
   means for applying a voltage between the electrodes and the electrical contact means, the arrangement being such that the voltage applied to the electrodes is of greater magnitude towards the downstream end of the path.

10. An apparatus as claimed in claim 9 in which the plurality of electrodes comprises at least three electrodes, the voltage applied to the electrodes increasing progressively towards the downstream end of the path.

11. An apparatus as claimed in claim 10 in which the electrodes are each connected to a respective point in a potential divider network.

12. An apparatus as claimed in claim 9 in which a first spool is provided at the beginning of the path for storing a strip of foil to be treated and has a brake for tensioning foil along the path.

13. A method of implanting an electret charge into a foil capable of retaining an effective electret charge, the method including passing the electret foil a first time over an electrode with one face of the foil in contact with the electrode and applying a first electric field between the electrode and the other face of the foil, passing the electret foil a second time over an electrode with one face of the foil in contact with the electrode and applying a second electric field between the electrode and the other face of the foil, whereby an effective electret charge is implanted into the foil.

14. A method as claimed in claim 13 in which the greatest electric field applied across the electret foil lies in the range of from about 30 to about 100 MV/m.

15. A method as claimed in claim 13 in which the foil is provided with a metallised surface on one face and this face is passed over an electrically conducting roller by which the electric field is applied.

16. A method as claimed in claim 13 in which the foil is passed over an electrode at a first positive or negative potential and then passed over the same electrode at a second positive or negative potential higher than the first potential.

17. A method as claimed in claim 13 in which the electrodes by which the electric fields are applied are electrically conducting rollers.

18. A method as claimed in claim 13 in which the electret foil is polytetrafluoroethylene.

19. An effective electret foil having an electret charge which has been implanted by a method including the steps of applying across the foil a first electric field and thereafter a second electric field of greater magnitude than the first.

20. A method of implanting an electret charge into an electret foil in a continuous process, the method including passing the electret foil over the surface of a resistive element having one end maintained at a higher positive or negative potential than the other end, there being a continuous change in potential along the element from one end to the other, whereby the magnitude of the electric field applied across the foil is increased continuously from a first value up to a second value greater than the first.

* * * * *